United States Patent
Nakauchi et al.

(10) Patent No.: US 9,610,980 B2
(45) Date of Patent: Apr. 4, 2017

(54) FRONT VEHICLE-BODY STRUCTURE OF VEHICLE

(71) Applicant: MAZDA MOTOR CORPORATION, Hiroshima (JP)

(72) Inventors: Shigeru Nakauchi, Hiroshima (JP); Takayuki Nakamae, Hiroshima (JP); Nobuyuki Nakayama, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 14/749,735

(22) Filed: Jun. 25, 2015

(65) Prior Publication Data
US 2016/0031484 A1 Feb. 4, 2016

(30) Foreign Application Priority Data
Jul. 31, 2014 (JP) .................... 2014-155886

(51) Int. Cl.
*B62D 21/15* (2006.01)
*B60R 19/24* (2006.01)
*B62D 25/08* (2006.01)

(52) U.S. Cl.
CPC ............ *B62D 21/152* (2013.01); *B60R 19/24* (2013.01); *B62D 25/082* (2013.01)

(58) Field of Classification Search
CPC ...... B60R 19/24; B62D 21/15; B62D 21/152; B62D 21/155; B62D 25/02; B62D 25/082
See application file for complete search history.

(56) References Cited

U.S. PATENT DOCUMENTS

| 5,031,958 A * | 7/1991 | Fujita | B62D 25/088 180/89.1 |
| 7,052,076 B2 * | 5/2006 | Kim | B62D 25/084 296/187.09 |
| 7,144,073 B2 * | 12/2006 | Uchida | B62D 21/152 296/193.09 |

(Continued)

FOREIGN PATENT DOCUMENTS

| DE | 2223880 A1 * | 11/1973 | ............ B60R 19/34 |
| DE | 102008031694 A1 * | 1/2010 | ............ B60R 19/34 |

(Continued)

*Primary Examiner* — Glenn Dayoan
*Assistant Examiner* — Paul Chenevert
(74) *Attorney, Agent, or Firm* — Studebaker & Brackett PC (57) ABSTRACT

There are provided a pair of right-and-left front side frames which extend in a vehicle longitudinal direction, a pair of right-and-left apron reinforcements which extend straightly in the vehicle longitudinal direction above and outward, in a vehicle width direction, of the pair of front side frames, a pair of right-and-left fender panels which cover respective outward sides, in the vehicle width direction, of the pair of apron reinforcements, a pair of right-and-left connecting frames which connect respective front end portions of the pair of apron reinforcements to the front side frames, and a pair of right-and-left connecting brackets which connect respective front-end side portions of the pair of fender panels to the pair of apron reinforcements. The connecting bracket is arranged substantially at the same longitudinal position as a connection portion of the apron reinforcement and the connecting frame in a plan view.

8 Claims, 5 Drawing Sheets

(56) References Cited

U.S. PATENT DOCUMENTS

| | | | | |
|---|---|---|---|---|
| 8,393,673 B2 * | 3/2013 | Terada | ................ | B62D 25/088 296/187.09 |
| 8,789,874 B2 * | 7/2014 | Okamura | ................ | B60R 19/12 180/68.4 |
| 9,061,707 B2 * | 6/2015 | Courtright | ........... | B62D 25/082 |
| 9,248,868 B2 * | 2/2016 | Stojkovic | ............ | B62D 27/023 |
| 9,248,869 B2 * | 2/2016 | Neculau | ................ | B62D 27/06 |
| 2002/0008408 A1 * | 1/2002 | Tilsner | ................ | B62D 25/082 296/193.09 |
| 2002/0093221 A1 * | 7/2002 | Forssell | ............... | B62D 25/082 296/187.09 |
| 2005/0077755 A1 * | 4/2005 | Yasui | .................... | B62D 25/16 296/203.02 |
| 2006/0131931 A1 * | 6/2006 | Marijnissen | ............ | B60R 21/34 296/198 |
| 2009/0243336 A1 * | 10/2009 | Honji | .................. | B62D 21/152 296/187.09 |
| 2012/0007373 A1 * | 1/2012 | Boettcher | ............... | B60R 19/24 293/132 |
| 2014/0035325 A1 * | 2/2014 | Naito | ................... | B62D 25/082 296/203.02 |
| 2014/0049074 A1 * | 2/2014 | Lee | ...................... | B62D 25/088 296/203.02 |
| 2014/0291053 A1 * | 10/2014 | Nagasawa | ............ | B62D 21/152 180/271 |
| 2016/0244097 A1 * | 8/2016 | Kondo | ................. | B62D 25/082 |

FOREIGN PATENT DOCUMENTS

| | | | | |
|---|---|---|---|---|
| DE | 102011111907 A1 * | 3/2012 | ............. | B60R 19/24 |
| DE | 102007010821 B4 * | 2/2016 | ........... | B62D 21/152 |
| FR | 3023244 A1 * | 1/2016 | ........... | B62D 21/152 |
| JP | 2010-000866 A | 1/2010 | | |
| JP | DE 102011118413 B4 * | 12/2014 | ........... | B62D 25/082 |

* cited by examiner

FRONT VEHICLE-BODY STRUCTURE OF VEHICLE

This application claims priority from Japanese Patent Application No. 2014-155886, filed on Jul. 31, 2014, the entire subject matter of which is incorporated herein by reference.

BACKGROUND OF THE INVENTION

The present invention relates to a front vehicle-body structure of a vehicle, and in particular, relates to the front vehicle-body structure of the vehicle in which the distance between a front side frame and an apron reinforcement which are spaced apart from each other when viewed from the front is relatively large.

Conventionally, a front vehicle-body structure of a vehicle, which comprises a pair of right-and-left front side frames extending in a vehicle longitudinal direction, a pair of right-and-left apron reinforcements extending straightly in the vehicle longitudinal direction above and outward, in a vehicle width direction, of the pair of front side frames, and a pair of right-and-left fender panels covering respective outward sides, in the vehicle width direction, of the pair of apron reinforcements, is known.

Japanese Patent Laid-Open Publication No. 2010-000866 discloses a front vehicle-body structure of a vehicle, in which a pair of right-and-left apron reinforcements extend in the vehicle longitudinal direction above a pair of front side frames, respective front side portions of which slant inward in a vehicle width direction such that their front end portions roughly match respective front end portions of the pair of front side frames in the vehicle longitudinal direction when viewed from above, and the front end portion of the apron reinforcement and the front end portion of the front side frame are interconnected by a support member as a connecting frame.

In these days, there is a tendency that a longitudinal-long shaped headlamp is used. The shape of the fender panel has changed according to the use of this longitudinal-long shaped headlamp. In a case of a lateral-long shaped headlamp, a front end portion of the fender panel is positioned near a rear end of the headlamp. By contrast, in a case of the longitudinal-long shaped headlamp, the headlamp is arranged over an area from a vehicle-body front corner portion to a vehicle-body side portion, so that the front end portion of the fender panel extends, passing through a space between a shroud and the headlamp, to a position near a rear end of a bumper face.

In a case in which the fender panel having its longitudinal-short front end portion is used from a viewpoint of vehicle's design, the support rigidity of the apron reinforcement can be ensured by configuring the front end portion of the apron reinforcement slanting inward in the vehicle width direction such that the front end portion of the apron reinforcement roughly match the front end portion of the front side frame when viewed from above, like the front vehicle-body structure of the above-described patent document.

However, in a case in which the fender panel having its front end portion extending forward long is used, it is necessary that the apron reinforcement is arranged so as to avoid the headlamp, so that it may not be easy from a layout to configure the front end portion of the apron reinforcement slanting inward in the vehicle width direction such that the front end portion of the apron reinforcement roughly match the front end portion of the front side frame. Accordingly, in a case in which the apron reinforcement is provided to extend straightly in the vehicle longitudinal direction above and outward, in the vehicle width direction, of the front side frame, there is a concern that the distance (offset amount) between the front side frame and the apron reinforcement which are spaced apart from each other in the vehicle width direction becomes so large that the support rigidity of the apron reinforcement may decrease (deteriorate) improperly.

Further, since the front end portion of the fender panel is supported at the front end portion of the apron reinforcement via a connecting bracket, there occurs a situation in which the weight of the fender panel intensively acts on the front end portion of the apron reinforcement which does not have the sufficient support rigidity. Therefore, there is a concern that the support rigidity of the fender panel may not be ensured sufficiently.

SUMMARY OF THE INVENTION

Accordingly, an object of the present invention is to provide a front vehicle-body structure of a vehicle which can properly improve the support rigidity of the fender panel regardless of the distance between the front side frame and the apron reinforcement which are spaced apart from each other.

The present invention is a front vehicle-body structure of a vehicle comprising a pair of right-and-left front side frames extending in a vehicle longitudinal direction, a pair of right-and-left apron reinforcements extending straightly in the vehicle longitudinal direction above and outward, in a vehicle width direction, of the pair of front side frames, a pair of right-and-left fender panels covering respective outward sides, in the vehicle width direction, of the pair of apron reinforcements, a pair of right-and-left connecting frames connecting respective front end portions of the pair of apron reinforcements to the pair of front side frames, and a pair of right-and-left connecting brackets connecting respective front-end side portions of the pair of fender panels to the pair of apron reinforcements, wherein the connecting bracket is arranged substantially at the same longitudinal position as a connection portion of the apron reinforcement and the connecting frame in a plan view.

According to the present front vehicle-body structure of the vehicle, since the connecting bracket is arranged substantially at the same longitudinal position as the connection portion of the apron reinforcement and the connecting frame in the plan view (i.e., when viewed from above), the support rigidity of the apron reinforcement can be improved regardless of the distance between the front side frame and the apron reinforcement which are spaced apart from each other, and the front end portion of the fender panel can be directly supported at the front side frame via the connecting frame.

In an embodiment of the present invention, the apron reinforcement comprises an upper panel and a lower panel which forms a closed cross section extending in the vehicle longitudinal direction together with the upper panel, and the connecting frame is interposed between and joined to the upper and lower panels of the apron reinforcement. According to this embodiment, the support rigidity of the fender panel can be improved by a joint strengthening of the connecting frame to the apron reinforcement.

In another embodiment of the present invention, the upper panel of the apron reinforcement is disposed between the connecting bracket and the connecting frame, and the connecting bracket is connected to the upper panel of the apron reinforcement. According to this embodiment, the support rigidity of the fender panel can be further improved by a joint strengthening of the connecting bracket to the connecting frame.

In another embodiment of the present invention, the front vehicle-body structure further comprises a pair of right-and-left fender stays connecting the respective front-end side portions of the pair of fender panels to the pair of front side frames in back of the pair of connecting frames. According to this embodiment, the front end portion of the fender panel can be directly supported at the front side frame via the fender stay.

Herein, the present front vehicle-body structure may be configured such that an upper-end portion of the connecting frame has a roughly U-shaped cross section, and is interposed between and joined to the upper and lower panels of the apron reinforcement.

Other features, aspects, and advantages of the present invention will become apparent from the following description which refers to the accompanying drawings.

DETAILED DESCRIPTION OF THE INVENTION

Hereafter, an embodiment of the present invention will be described specifically referring to the drawings. The following description exemplifies the present invention which is applied to a vehicle, but the present invention should not be limited to this.

The present embodiment of the present invention will be described referring to FIGS. 1-9. As shown in FIGS. 1-4, a vehicle V comprises a pair of right-and-left front side frames 1 which extend in a vehicle longitudinal direction, a pair of right-and-left apron reinforcements 2 which extend in the vehicle longitudinal direction, and a pair of right-and-left fender panels 3 which cover outward sides, in the vehicle width direction, of the vehicle. Herein, since each of pairs of members is symmetrical, a right-side structure of the structure will be described mainly. An arrow F shows a forward direction, and an arrow L shows a leftward direction.

Figure 1:
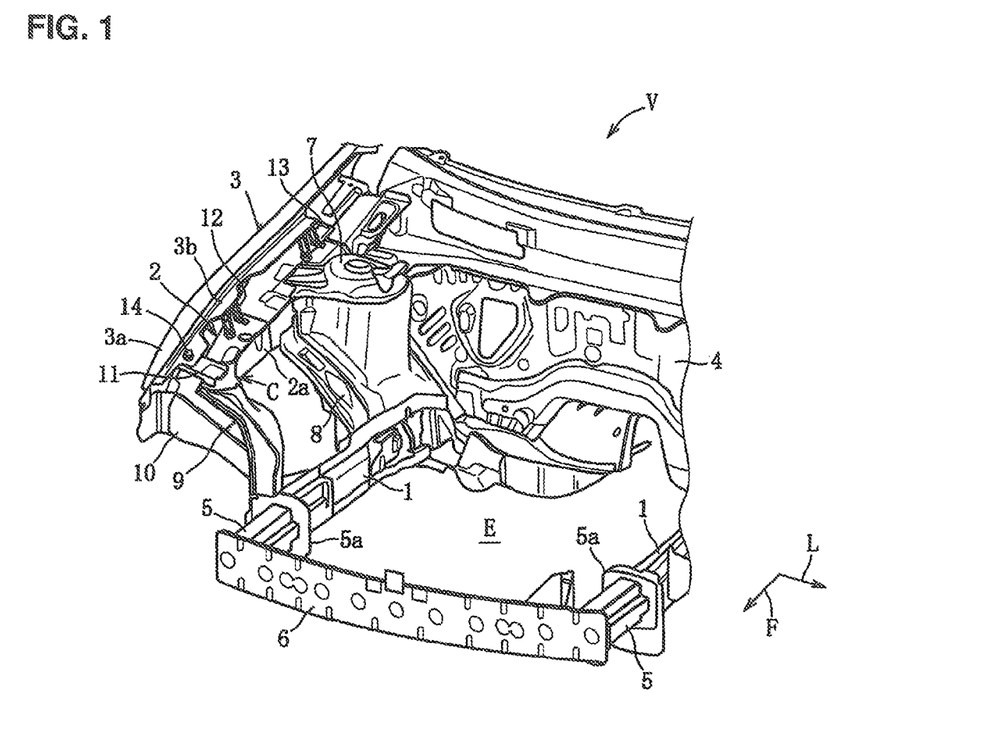
FIG. 1 is a perspective view of a front vehicle body of a vehicle according to an embodiment of the present invention.
Figure 2:
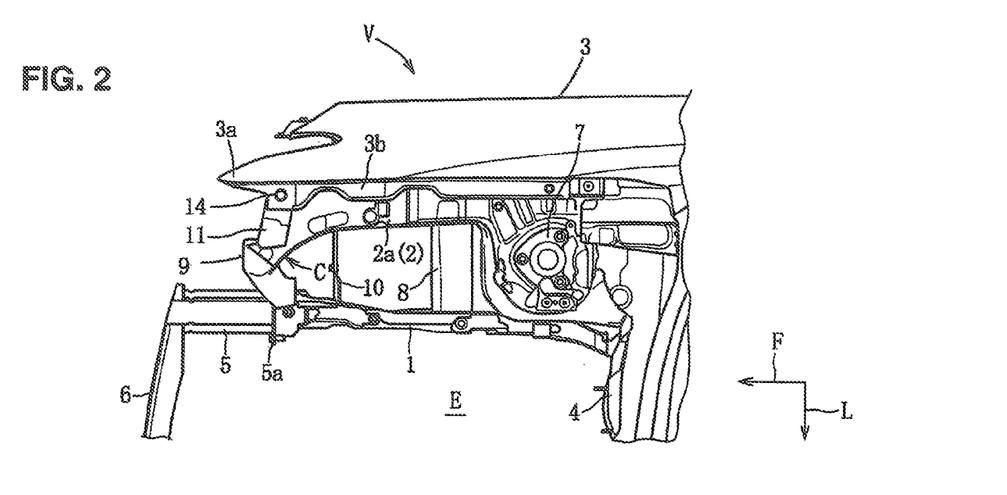
FIG. 2 is a right-side plan view.
Figure 3:
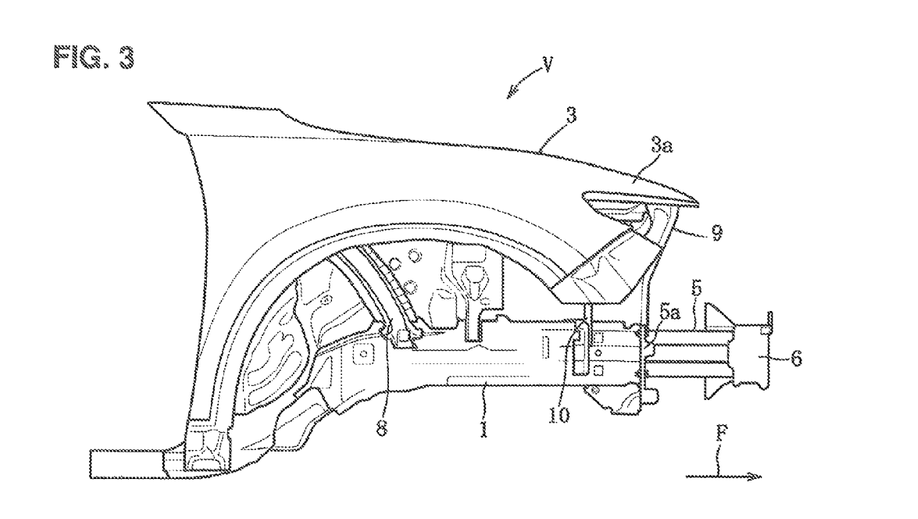
FIG. 3 is a right-side side view.

First, the pair of right-and-left front side frames 1 will be described. As shown in FIGS. 1-3, the pair of right-and-left front side frames 1 are configured to have a roughly rectangular-shaped closed cross section, respectively, and extend in the vehicle longitudinal direction on right-and-left sides of an engine room E in front of a dash panel 4, which partitions a front end of a vehicle compartment. The front side frame 1 extends roughly horizontally from a front-end side position of the vehicle V, its rear-end side middle portion is joined to a vertical wall portion of a dash panel 4, and its rear-end side portion extends obliquely rearward and downward along a lower face of a slant portion and a floor panel (not illustrated), and joined. The rear-end side portion of the front side frame 1 is joined to the dash panel 4.

A rear end portion of a crash can 5 is fixed to a front end portion of the front side frame 1 via a set plate 5a. This crash can 5 can absorb impact energy by its being crushed only without any breakage of the front side frame 1 in a case in which an impact load is relatively small in a light vehicle collision or the like. A bumper reinforcement 6 which extends in the vehicle width direction is attached to respective front end portions of the pair of crash cans 5.

Next, the pair of right-and-left apron reinforcements 2 will be described. The pair of right-and-left apron reinforcements 2 are arranged above and outward, in the vehicle width direction, of the pair of right-and-left front side frames 1, and extend roughly straightly from respective base portions of a pair of font hinge pillars (not illustrated) to a position which is located substantially at the same longitudinal position, i.e., the same position in the vehicle longitudinal direction, as respective rear end portions of the crash cans 5. The apron reinforcement 2 has a closed cross section extending in the vehicle longitudinal direction, which is formed by an upper panel 2a which forms an upper-half portion including an inner wall portion and a lower panel 2b which forms a lower-half portion including an outer wall portion.

As shown in FIGS. 1, 2, 4 and 6, the apron reinforcement 2 has a rectangular closed cross section at a range from its rear-end side portion to a portion located near its front end. A pole-shaped suspension tower 7 and an engine mount frame 8 are provided to extend between the front side frame 1 and the apron reinforcement 2 at the rear-end side portion having the rectangular closed cross section of the apron reinforcement 2.

Figure 4:
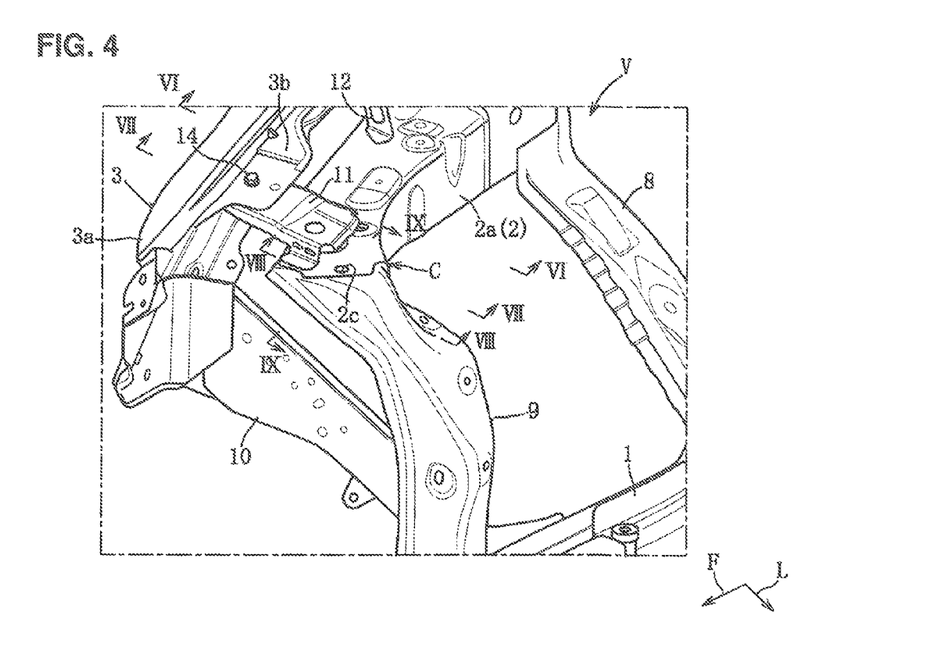
FIG. 4 is a major-part enlarged view of FIG. 1.
Figure 7:
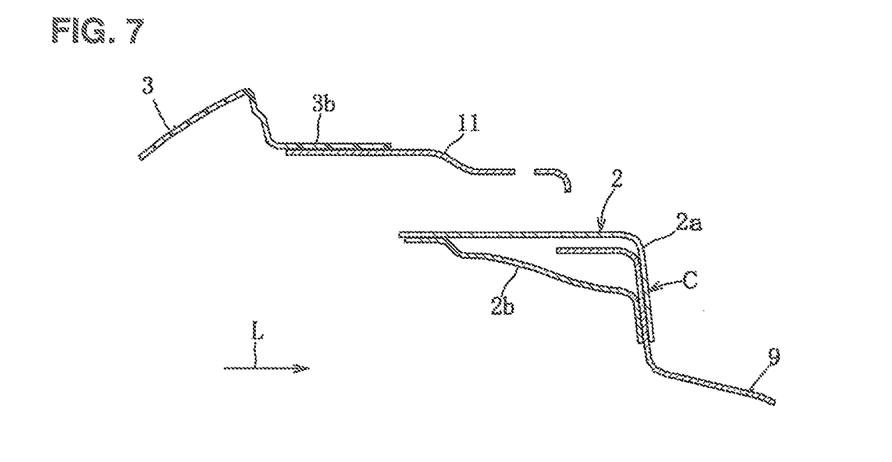
FIG. 7 is a sectional view taken along line VII-VII of FIG. 4.
Figure 8:
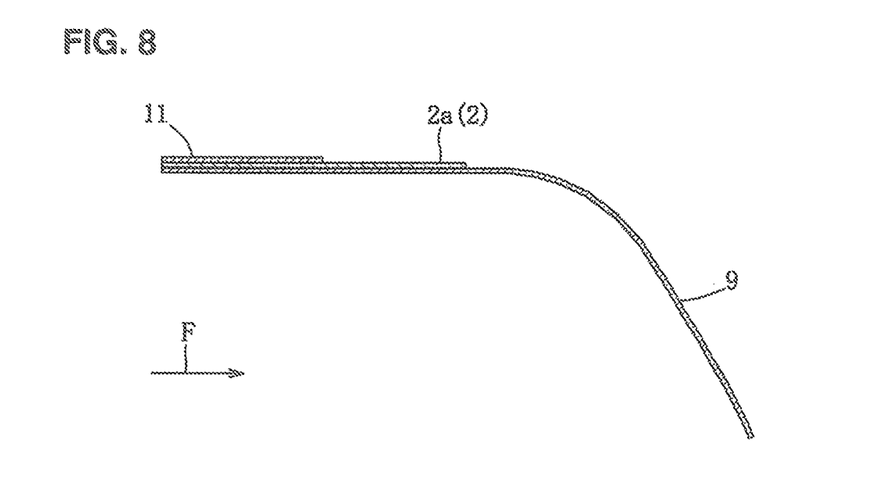
FIG. 8 is a sectional view taken along line VIII-VIII of FIG. 4.
Figure 9:
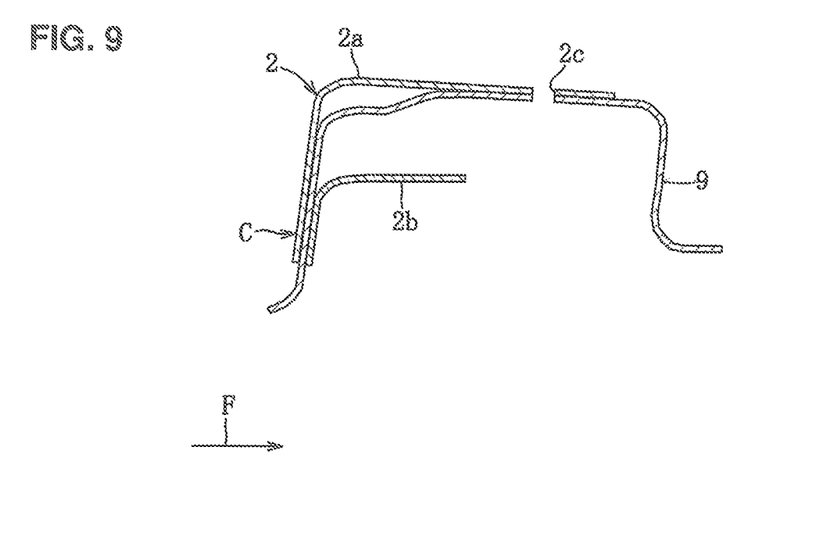
FIG. 9 is a sectional view taken along line IX-IX of FIG. 4.

As shown in FIGS. 4 and 7, the apron reinforcement 2 has a triangular closed cross section at a portion thereof which is located in front of the above-described portion having the rectangular closed cross section. As shown in FIGS. 4, 8 and 9, only the upper panel 2a is provided to extend at a portion of the apron reinforcement 2 which is located forward of the above-described portion having the triangular closed cross section. An attachment portion 2c for attaching a radiator shroud (not illustrated) to support a radiator is formed at a front-end inside portion of the upper panel 2a.

Figure 5:
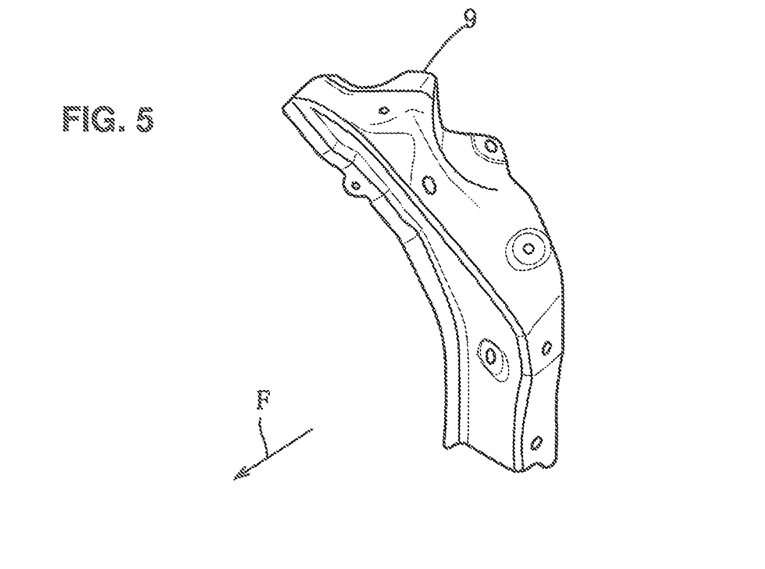
FIG. 5 is a perspective view of a connecting frame.
Figure 6:
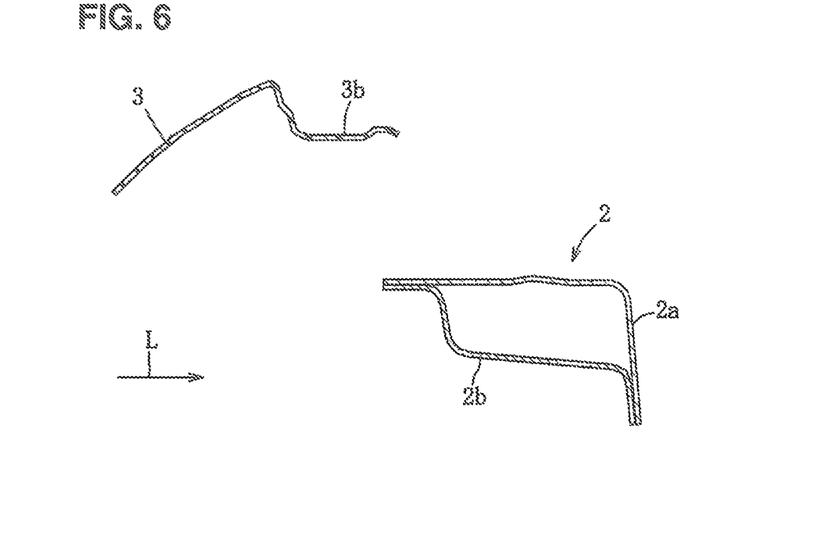
FIG. 6 is a sectional view taken along line VI-VI of FIG. 4.

As shown in FIGS. 1-4 and 6-9, the front end portion of the apron reinforcement 2 is connected to the front end portion of the front side frame 1 via the connecting frame 9. As shown in FIG. 5, the connecting frame 9 is made of a metal plate through pressing and of an inverse-L shape when viewed from the front. An upper end portion of the connecting frame 9 has a roughly U-shaped cross section, and is interposed between the upper panel 2a and the lower panel 2b. These three members are joined together. This three-member joint portion corresponds to a connection portion C of the connecting frame 9 and the apron reinforcement 2. A lower end portion of the connecting frame 9 has a roughly L-shaped cross section, and is joined to a right-side portion of the front-end portion of the front side frame 1.

Next, the pair of right-and-left fender panels 3 will be described. As shown in FIG. 3, the fender panel 3 is provided to cover the right side (the outward side in the vehicle width direction) of the apron reinforcement 2 from above. The fender panel 3 includes a tapering-shaped tip portion 3a which extends to a position near a rear end of the bumper reinforcement 6 along the inside of a longitudinal-long shaped headlamp and a flange portion 3*b* which extends in the vehicle longitudinal direction at its left-side inside edge portion.

The fender panel 3 is connected to the front side frame 1 via a fender stay 10, and connected to the apron reinforcement 2 via first-third connecting brackets 11-13. The fender stay 10 is made of a metal plate through pressing. The fender stay 10 interconnects a front-end side portion of a lower-half portion of the fender panel 3 and a right-side portion of the front end portion of the front side frame 1.

As shown in FIGS. 4, 7 and 8, the first connecting bracket 11 is arranged substantially at the same longitudinal position as the connection portion C of the front side frame 1 and the apron reinforcement 2 in the plan view. The first connecting bracket 11 is made of a metal plate through pressing and has a roughly U-shaped cross section opening downward. The first connecting bracket 11 has a pair of flange portions which extend longitudinally from a left-side lower end of a front wall portion and a left-side lower end of a rear wall portion. A right-end side portion of the first connecting bracket 11 is fastened to the flange portion 3*b* with a fastening member 14, and the both flange portions of the first connecting bracket 11 are joined to the upper panel 2*a* by welding. The flange portion of the front wall portion is arranged at a position near the right side of the attachment portion 2*c*, and the upper panel 2*a* is interposed between this flange portion and the connecting frame 9. These three members are joined together.

As shown in FIG. 1, the second and third connecting brackets 12, 13 are joined to the flange portion 3*b* in back of the first connecting bracket 11. The second and third connecting brackets 12, 13 are made of a metal plate through pressing and have a roughly U-shaped cross section opening downward, and have flange portions which extend longitudinally from lower ends of respective front wall portions and from lower ends of respective rear wall portions. The third connecting bracket 13 is joined to the upper panel 2*a* at a position near the suspension tower 7, and the second connecting bracket 12 is joined to the upper panel 2*a* at a middle position between the first and third connecting brackets 11, 13.

Next, the operation and effects of the above-described front vehicle-body structure of the vehicle will be described. According to the present front vehicle-body structure of the vehicle, since the first connecting bracket 11 is arranged substantially at the same longitudinal position as the connection portion C of the apron reinforcement 2 and the connecting frame 9 in the plan view, the support rigidity of the apron reinforcement 2 can be improved regardless of the distance between the front side frame 1 and the apron reinforcement 2 which are spaced apart from each other, and the front end portion of the fender panel 3 can be directly supported at the front side frame 1 via the connecting frame 9.

Since the apron reinforcement 2 comprises the upper panel 2*a* and the lower panel 2*b* which forms the closed cross section extending in the vehicle longitudinal direction together with the upper panel 2*a*, and the connecting frame 9 is interposed between and joined to the upper and lower panels 2*a*, 2*b* of the apron reinforcement 2, the support rigidity of the fender panel 3 can be improved by a joint strengthening of the connecting frame 9 to the apron reinforcement 2.

Since the upper panel 2*a* of the apron reinforcement 2 is disposed between the first connecting bracket 11 and the connecting frame 9, and the first connecting bracket 11 is connected to the upper panel 2*a* of the apron reinforcement 2, the support rigidity of the fender panel 3 can be further improved by the joint strengthening of the first connecting bracket 11 to the connecting frame 9.

Since the present front vehicle-body structure further comprises the pair of right-and-left fender stays 10 which connect the respective front-end side portions of the pair of fender panels 3 to the pair of front side frames 1 in back of the pair of connecting frames 9, the front end portion of the fender panel 3 can be directly supported at the front side frame 1 via the fender stay 10.

Next, modifications of the above-described embodiment will be described.

1) While the above-described embodiment describes the example in which the vehicle is equipped with the longitudinal-long shaped headlamp, any vehicle equipped with a lateral-long shaped headlamp is applicable as long as this vehicle has the large distance between the front side frame and the apron reinforcement which are spaced apart from each other, thereby providing the same effects.

2) While the above-described embodiment describes the example in which the fender stay is directly fixed to the front side frame, the fender stay may be fixed to the apron reinforcement. Further, if a requirement regarding the support rigidity is met, this fender stay may be omitted.

3) The present invention should not be limited to the above-described embodiment, and any other modifications or improvements may be applied within the scope of a spirit of the present invention.

What is claimed is:

1. A front vehicle-body structure of a vehicle, comprising:
   a pair of right-and-left front side frames extending in a vehicle longitudinal direction;
   a pair of right-and-left apron reinforcements extending straightly in the vehicle longitudinal direction above and outward, in a vehicle width direction, of the pair of front side frames;
   a pair of right-and-left fender panels covering respective outward sides, in the vehicle width direction, of the pair of apron reinforcements;
   a pair of right-and-left connecting frames connecting respective front end portions of the pair of apron reinforcements to the pair of front side frames; and
   a pair of right-and-left connecting brackets connecting respective front-end side portions of the pair of fender panels to the pair of apron reinforcements,
   wherein said connecting bracket is arranged substantially at the same longitudinal position as a connection portion of said apron reinforcement and said connecting frame in a plan view.

2. The front vehicle-body structure of the vehicle of claim 1, further comprising a pair of right-and-left fender stays connecting the respective front-end side portions of said pair of fender panels to said pair of front side frames in back of said pair of connecting frames.

3. A front vehicle-body structure of a vehicle, comprising:
   a pair of right-and-left front side frames extending in a vehicle longitudinal direction;
   a pair of right-and-left apron reinforcements extending straightly in the vehicle longitudinal direction above and outward, in a vehicle width direction, of the pair of front side frames;
   a pair of right-and-left fender panels covering respective outward sides, in the vehicle width direction, of the pair of apron reinforcements;
   a pair of right-and-left connecting frames connecting respective front end portions of the pair of apron reinforcements to the pair of front side frames; and a pair of right-and-left connecting brackets connecting respective front-end side portions of the pair of fender panels to the pair of apron reinforcements, wherein said connecting bracket is arranged substantially at the same longitudinal position as a connection portion of said apron reinforcement and said connecting frame in a plan view, and wherein said apron reinforcement comprises an upper panel and a lower panel which forms a closed cross section extending in the vehicle longitudinal direction together with the upper panel, and said connecting frame is interposed between and joined to the upper and lower panels of the apron reinforcement.

4. The front vehicle-body structure of the vehicle of claim 3, further comprising a pair of right-and-left fender stays connecting the respective front-end side portions of said pair of fender panels to said pair of front side frames in back of said pair of connecting frames.

5. The front vehicle-body structure of the vehicle of claim 3, wherein an upper-end portion of said connecting frame has a roughly U-shaped cross section, and is interposed between and joined to the upper and lower panels of said apron reinforcement.

6. The front vehicle-body structure of the vehicle of claim 3, wherein the upper panel of said apron reinforcement is disposed between said connecting bracket and said connecting frame, and the connecting bracket is connected to the upper panel of the apron reinforcement.

7. The front vehicle-body structure of the vehicle of claim 6, further comprising a pair of right-and-left fender stays connecting the respective front-end side portions of said pair of fender panels to said pair of front side frames in back of said pair of connecting frames.

8. The front vehicle-body structure of the vehicle of claim 6, wherein an upper-end portion of said connecting frame has a roughly U-shaped cross section, and is interposed between and joined to the upper and lower panels of said apron reinforcement.

* * * * *